(12) United States Patent
Penn

(10) Patent No.: US 8,434,732 B1
(45) Date of Patent: May 7, 2013

(54) MULTI-FUNCTIONAL PORTABLE ANCHORING SYSTEM

(76) Inventors: John L. Penn, Cleveland, TN (US);
Kathy Penn, legal representative,
Cleveland, TN (US)

( * ) Notice: Subject to any disclaimer, the term of this patent is extended or adjusted under 35 U.S.C. 154(b) by 0 days.

(21) Appl. No.: 13/524,747

(22) Filed: Jun. 15, 2012

(51) Int. Cl.
*F16M 13/00* (2006.01)
(52) U.S. Cl.
USPC ...... 248/558; 248/346.01; 248/351; 119/512; 119/513
(58) Field of Classification Search ............ 119/60, 119/61.1, 900, 58, 59, 61.2, 61.3, 513, 512, 119/502, 514, 519, 522, 155, 518; 248/558, 248/345, 346.01, 351, 354.5, 354.6, 499, 248/500, 502, 508
See application file for complete search history.

(56) References Cited

U.S. PATENT DOCUMENTS

| | | | | |
|---|---|---|---|---|
| 2,720,861 A * | 10/1955 | Stroup et al. | ................. | 119/526 |
| 2,798,501 A * | 7/1957 | Oliver | ............................ | 135/134 |
| 2,989,967 A * | 6/1961 | Lee | ............................ | 135/88.13 |
| 3,135,267 A * | 6/1964 | Liebig | .......................... | 414/132 |
| 3,921,585 A * | 11/1975 | Hall | .............................. | 119/512 |
| 4,244,324 A * | 1/1981 | Kratky | ......................... | 119/524 |
| 4,250,836 A * | 2/1981 | Smith | .......................... | 119/512 |
| 5,158,103 A * | 10/1992 | Leu | ............................ | 135/88.06 |
| 5,195,461 A * | 3/1993 | Brown | ...................... | 119/61.57 |
| 5,237,960 A * | 8/1993 | Wilson | ......................... | 119/514 |
| 5,295,500 A * | 3/1994 | Leu | ............................ | 135/88.06 |
| 5,558,043 A * | 9/1996 | Givens | ........................ | 119/519 |
| 5,564,367 A * | 10/1996 | Boyanton | .................... | 119/474 |
| 5,660,425 A * | 8/1997 | Weber | .......................... | 296/163 |
| 5,899,171 A * | 5/1999 | Abrahamson | ................ | 119/512 |
| 6,244,285 B1* | 6/2001 | Gamache | ........................ | 135/67 |
| 6,394,118 B1* | 5/2002 | Cikanowick et al. | ...... | 135/88.06 |
| 6,467,433 B1* | 10/2002 | Stanton et al. | ................ | 119/512 |
| 6,499,435 B2* | 12/2002 | Markham | ..................... | 119/512 |
| 6,516,822 B2* | 2/2003 | Schlier | ......................... | 135/88.06 |
| 6,854,426 B2* | 2/2005 | Campbell et al. | ............. | 119/513 |
| 7,350,480 B1* | 4/2008 | Hughes | ......................... | 119/512 |
| 7,389,746 B2* | 6/2008 | Byl et al. | ...................... | 119/512 |
| 7,418,924 B2* | 9/2008 | Klene | ............................. | 119/60 |

* cited by examiner

*Primary Examiner* — Terrell McKinnon
*Assistant Examiner* — Monica Millner
(74) *Attorney, Agent, or Firm* — Luedeka Neely Group, P.C.

(57) ABSTRACT

A portable anchoring apparatus and kit is provided which allows large animals to be safely hitched a safe distance from an anchoring object (e.g., a motor vehicle). Other embodiments of the portable anchoring apparatus and kit include a portable anchored table, a portable anchored large sign, and a portable anchored combination table and large sign.

10 Claims, 14 Drawing Sheets

MULTI-FUNCTIONAL PORTABLE ANCHORING SYSTEM

PRIORITY

This application is a continuation application claiming priority to U.S. application Ser. No. 12/478,284 entitled "MULTI-FUNCTIONAL PORTABLE ANCHORING SYSTEM" filed on Jun. 4, 2009, to John L. Penn, the entirety of which is incorporated herein by reference.

This disclosure relates to the field of portable anchored objects. More particularly, this disclosure relates to a portable anchoring apparatus for providing sturdy and safe anchoring for large animals.

BACKGROUND

The need for safely hitching large animals in remote places has been around for hundreds of years. In modern times, there are numerous laws and/or rules in various jurisdictions including state and federal parks detailing to what a large animal (e.g., a horse) may be hitched. Hitching horses to trees or bushes, for example, is sometimes not allowed. In such cases, an alternative hitching rail is needed.

For this and other reasons, certain horse trailers such as, for example, the horse trailer described in U.S. Pat. No. 4,159,142 to Larson entitled "Foldable Exterior Feeding And Watering Facilities For Animal Carrying Vehicles," have provided a rail or other means that extends from the side of a large (and often expensive) animal trailer. However, this option has proven undesirable for a number of reasons including, for example, large animals tearing such rails from the sides of trailers; animals kicking, rubbing, or biting such vehicles and, thereby, causing significant damage to such vehicles; and injuries received by hitched animals from contact with anchoring animal trailers due to the proximity of such animals to the directly attached anchoring structure.

What is needed, therefore, is an anchoring apparatus that overcomes the deficiencies described above.

SUMMARY

The above and other needs are met by a portable, quick assembly anchoring apparatus for hitching a large animal at a safe distance from an anchoring object. In a preferred embodiment, the apparatus includes an anchoring platform; a plurality of elongate base members, including a first base member and a second base member; and a rail apparatus including a first end and a second end. Each base member includes a first end and a second end and is removably attachable adjacent the anchoring platform at or near the respective first ends of the base members. The rail apparatus is preferably removably attachable adjacent the base members at or near the first end and the second end of the rail apparatus and at or near the respective second ends of the base members.

Preferably, the anchoring apparatus includes a primary member, a secondary member, and a tertiary member. The secondary members comprise the first ends of the base members, the tertiary members comprise the second ends of the base members, and the tertiary members are removably attachable to the secondary members. The tertiary member of the first base member is preferably includes a first transition member oriented substantially orthogonal to the first base member and an elongate first support member preferably removably attachable to a distal end of the first transition member. The tertiary member of the second base preferably includes a second transition member oriented substantially orthogonal to the second base member and an elongate second support member preferably removably attachable to a distal end of the second transition member.

The anchoring apparatus may also include an elongate first extension member removably attachable at or near the first end of the rail apparatus and a first side support removably attachable at or near a distal end of the first extension member. The first side support is preferably oriented substantially orthogonal to the extension member. A distal end of the first side support is configured to rest adjacent the ground when assembled to provide support for the first extension member.

The anchoring apparatus may also include a side support extension member removably attached to the first end of the side support. The side support extension member preferably includes an attached convenience feature. This convenience feature may, for example, be an apparatus selected from the group consisting of a bridle holder and a solar powered light.

The anchoring apparatus may further include an elongate second extension member removably attachable at or near the second end of the rail apparatus and a second side support removably attachable at or near a distal end of the second extension member. The second side support is preferably oriented substantially orthogonal to the extension member. A distal end of the second side support is configured to rest adjacent the ground when assembled to provide support for the second extension member.

The anchoring platform preferably includes a mass receiving platform having a first end and a second end. The mass receiving platform preferably includes a substantially planar plate configured for receiving one or more anchoring objects, a first guide member attached at or near the first end of the mass receiving platform, and a second guide member attached at or near the second end of the mass receiving platform. The first guide member is preferably oriented substantially perpendicular to the length axis of the mass receiving platform wherein the first guide member is configured for removable attachment adjacent the first end of the first base member. The second guide member is preferably oriented substantially perpendicular to the length axis of the mass receiving platform wherein the second guide member is configured for removable attachment adjacent the first end of the second base member.

The rail apparatus preferably includes a primary rail, a secondary rail, and a plurality of cross rails. The primary rail and the secondary rail are substantially parallel. At least two of the cross rails are oriented substantially orthogonal to the primary rail. The primary rail and the secondary rail are both attached to the at least two cross rails.

The transition members, base members, support members, rail apparatus, extension members, and side supports each preferably include substantially hollow metal beams having an average wall thickness ranging from about 2.5 mm to about 4.0 mm and an average cross-sectional diameter ranging from about 2.0 cm to about 7.0 cm, wherein the metal is selected from the group consisting of aluminum, an aluminum alloy, magnesium, a magnesium alloy, titanium, a titanium alloy, iron, and an iron alloy.

In one embodiment, the extension member may be reciprocated within at least a portion of a hollow interior of the rail apparatus. In this embodiment, the extension member may be set in a temporary fixed position relative to the rail apparatus by an attachment apparatus whereby the portion of the length of the extension member extending from the first end of the rail apparatus may be selectively adjusted. Similarly, in the same or a related embodiment, the first base member may be reciprocated within a hollow interior of the first guide member. The second base member may be reciprocated within a hollow interior of the second guide member. The anchoring platform may be set in a temporary fixed position relative to the base members by an attachment apparatus.

In another aspect, embodiments of the disclosure provide an apparatus for a multipurpose portable anchoring apparatus that includes a plurality of elongate base members including a first base member and a second base member, an anchoring platform, a first guide, a second guide member, and an application apparatus. Each base member includes a first end and a second end. The application apparatus is preferably removably attached at or near the second ends of the base members.

The anchoring platform preferably includes a mass receiving platform having a first end and a second end. The mass receiving platform preferably includes a substantially planar plate for receiving one or more anchoring objects. The first guide member is attached at or near the first end of the mass receiving platform. The first guide member is preferably oriented substantially perpendicular to the length axis of the mass receiving platform for removable attachment to the first base member at or near the first end of the first base member. The second guide member is preferably attached at or near the second end of the mass receiving platform. The second guide member is preferably oriented substantially perpendicular to the length axis of the mass receiving platform for removable attachment to the second base member at or near the first end of the second base member.

The multipurpose portable anchoring apparatus preferably further includes an embodiment wherein the application apparatus includes a rail apparatus including a first end and a second end; wherein the first base member further includes an elongate first support member including a first end and a second end, and the second base member further includes an elongate second support member including a first end and a second end; wherein the support members are permanently or removably attached to the rail apparatus at or near the second ends of the support members.

The application apparatus may alternatively or additionally include a support platform. In such an embodiment, the support platform may include a substantially planar upper surface wherein the first base member further includes an elongate first modified support member and the second base member further includes an elongate second modified support member. The first modified support member and the second modified support member both include a first end, a second end, and a support arm. The support arms of the modified support members are permanently or removably attached to the support platform for supporting the support platform.

The application apparatus of the multipurpose portable anchoring apparatus may also additionally or alternatively include a first post beam, second post beam, and a display structure that includes a sign surface. The post beams each include a first end and a second end. The first modified support member is preferably removably attached to the first post beam at or near the second end of the first modified support member and at or near the first end of the first post member. The second modified support member is preferably removably attached to the second post beam at or near the second end of the second modified support member and at or near the first end of the second post member. The display structure is permanently or removably attached to the post members at or near the second ends of the post members. In a related embodiment, the first base member is removably attached to the first post beam at or near the second end of the first base member and at or near the first end of the first post member. The second base member is removably attached to the second post beam at or near the second end of the base member and at or near the first end of the second post member. The display structure is permanently or removably attached to the post members at or near the second ends of the post members.

In yet another aspect, embodiments of the disclosure provide a kit including parts for constructing various versions of the portable anchoring apparatus described above. In one embodiment, the kit includes a plurality of elongate base members, an anchoring member, and an application apparatus. Each base member includes a first end and a second end. The anchoring member is removably attachable to the elongate base members at or near the first ends of the base members. The application apparatus is removably attachable at or near the second ends of the base members.

In one embodiment, the application apparatus includes a rail apparatus appendage and a plurality of support members. Each support member includes a first end and a second end. Each support member is removably attachable to the base members at or near the second ends of the base members and at or near the first ends of the support members. The rail apparatus includes a hitching rail which is removably attachable to the support members at or near the second ends of the support members. The kit may also include a first and second extension member and a first and second side support. The side supports provide support to the extension members. The first and second ends and first and second side supports each contain a first and second end. The first extension member is removably attachable to the rail apparatus at or near the first end of the rail apparatus and at or near the first end of the first extension member. The second extension member is removably attachable to the rail apparatus at or near the second end of the rail apparatus and at or near the first end of the second extension member. The first side support is removably attachable to the first extension member at or near the second end of the first extension member and at or near the first end of the first side support. The second side support is removably attachable to the second extension member at or near the second end of the second extension member and at or near the first end of the second side support.

The kit also may contain groups of further parts. These other groups are selected from the group consisting of a sign appendage, a table appendage, and a sign and table appendage. The sign appendage includes a first post beam, a second post beam, and a display structure. The first and second post beams each include a first and second end. The display structure includes a sign surface.

The first base member is removably attachable to the first post beam at or near the second end of the first base member and at or near the first end of the first post member. The second base member is removably attachable to the second post beam at or near the second end of the base member and at or near the first end of the second post member. The display structure is permanently attached or removably attachable to the post members at or near the second ends of the post members.

The table appendage includes a support platform, a first modified support member and a second modified support member. The support platform preferably includes a substantially planar upper surface. The first modified support member and the second modified support member each include a first end, a second end, and a support arm. The support arms of the modified support members are removably attachable to the support platform for supporting the support platform. The modified support members are removably attachable to the base members at or near the first ends of the modified support members and at or near the second ends of the base members.

The sign and table appendage further includes the modified support members, the first post beam, the second post beam, and the display structure including the sign surface. The first ends of the post beams are removable attachable to the second ends of the modified support members.

Embodiments of the present disclosure have many advantages. For example, the portable anchoring apparatus and variations thereof is structured so as to keep hitched animals a certain minimal distance away from an anchoring object (e.g., a trailer or other expensive vehicle). The use of one or more extension members prevents an animal (e.g., a horse) from getting close enough to the anchoring object to paw, chew, kick, gore, and/or rub such anchoring object. In so doing, both the anchoring object is protected from damage caused by the hitched animal and the animal is protected from sharp objects or other hazards that may be present on the anchoring object.

Another advantage is that the various parts of the portable anchoring apparatus are not directly or otherwise permanently attached to an anchoring object. Rather, the anchoring object provides substantial mass only on the mass receiving platform to prevent the portable anchoring apparatus from moving, but will not cause direct damage to the anchoring object if for example, a horse pulls suddenly and/or violently away from the portable anchoring apparatus, causing the apparatus to break or otherwise fail.

Another advantage of various embodiments described above is a sturdy and robust support platform may be transported to/from remote locations and used effectively in many different ways, such as, for example, a table. The spacing between an anchoring object and the support platform is ideal for a person to stand or sit as in a booth, kiosk, stand or other similar booth-like structure. Large signage may also be employed and supported on such booth-like structure, attracting attention to the location where the particular apparatus is assembled and deployed. The signage may be used with or without the use of a support platform. Therefore, the majority of parts of various embodiments are usable in various configurations, resulting in significant flexibility for a user who may have a need to use a remote hitching rail at a first event, a remote booth at a second event, and a large sign with no booth at a third event or location.

The portable nature of the various embodiments is particularly useful in hard terrain and/or the winter months in northern zones (or southern zones as the case may be below the equator) where the ground is too hard to anchor a large sign or other structure by digging into the ground. In any event, each embodiment may be quickly and easily assembled and/or disassembled with few tools, if any, depending on the particular embodiment used.

In summary the embodiments described herein provide a convenient, robust, relatively lightweight, rapid assemble/disassemble structure for performing activities in remote locations including hitching strong animals at a desired distance from an anchoring object, providing a booth-like site with or without relatively large signage, and providing relatively large signage for attracting the attention of on-lookers.

BRIEF DESCRIPTION OF THE DRAWINGS

Further features, aspects, and advantages of the present disclosure will become better understood by reference to the following detailed description, appended claims, and accompanying figures, wherein elements are not to scale so as to more clearly show the details, wherein like reference numbers indicate like elements throughout the several views, and wherein:

DETAILED DESCRIPTION

Various terms used herein are intended to have particular meanings. Some of these terms are defined below for the purpose of clarity. The definitions given below are meant to cover all forms of the words being defined (e.g., singular, plural, present tense, past tense). If the definition of any term below diverges from the common understood and/or dictionary definition of such term, the definitions below control.

Attach: Any form of the term "attach" as stated in this disclosure is to be interpreted broadly as encompassing permanent attachment or removable attachment capability unless otherwise expressly limited herein.

Attachment apparatus: any apparatus: apparatus used to attach a first object to a second object, such apparatus becoming a part of the compound structure formed by the attachment of the first object to the second object.

Beam: an elongate and sturdy object that, optionally, may be at least partially hollow and which, optionally, may have a substantially continuous curved elongate surface (e.g., like a pole) and/or a plurality of elongate surfaces, one or more of which, optionally, may be substantially planar.

Extension (noun): a sub-part of a larger structure, the sub-part attached to other sub-parts of such larger structure by attachment means known to persons having ordinary skill in the art including without limitation welding or an attachment apparatus.

Permanent means of attachment: A solid object, semi-solid object (e.g., a gel), liquid substance, or portion of a structure resulting from a method of attaching a plurality of solid objects to one another, such object, substance, and/or method usable to create a compound structure by attaching at least two previously physically separated solid objects (e.g., a first object and a second object), wherein the attachment between the first object and the second object is such that significant undesirable damage to the first object and/or the second object is likely to occur if the compound structure is forced to be physically re-separated.

Removable: A quality or capability of a first object being separable from a second object after the first object and the second object have been attached together to form a compound structure. A first object is removable from a second object if the first object has been attached to the second object via a non-permanent means of attachment.

Selectively Attached: A quality of a first object being removably attachable to a second object at a plurality of preferably incrementally separated locations along the second object.

Sturdy: an object having an average Young's Modulus (E) of about 10 Gigapascals (GPa), and, preferably, greater than 40 GPa.

Figure 1:
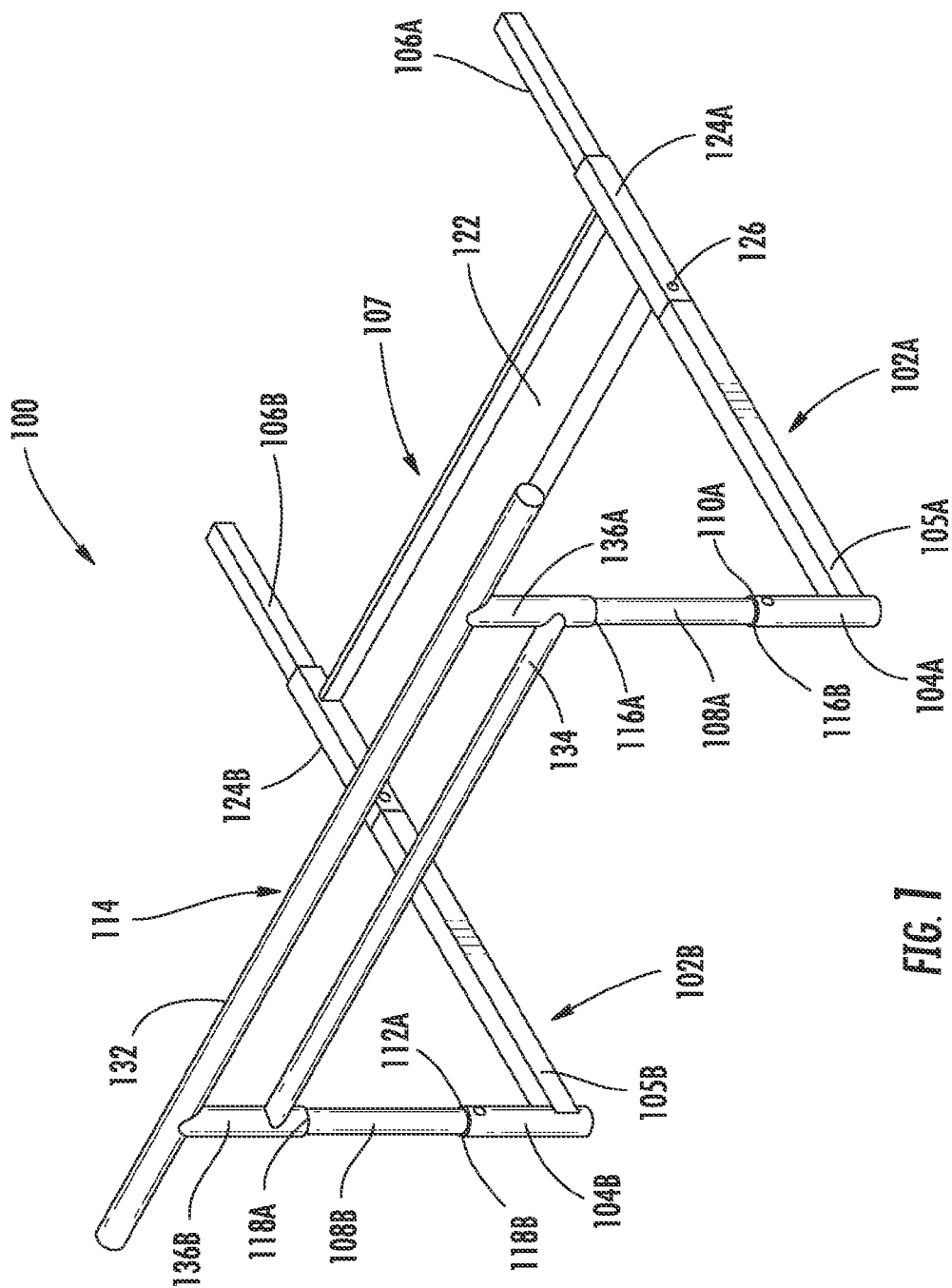
FIG. 1 shows a perspective view of an embodiment of portable anchoring apparatus including a hitching rail.

FIG. 1 depicts a preferred embodiment of a portable anchoring apparatus 100 including a plurality of elongate, preferably L-shaped, base members 102 including a first base member 102A and a second base member 102B, each base member 102 including a vertical extension 104 (including a first vertical extension 104A and a second vertical extension 104B), a primary horizontal base member 105 (including a first primary horizontal base member 105A and a second primary horizontal base member 105B), and a secondary horizontal base member 106 (including a first secondary horizontal base member 106A and a second secondary horizontal base member 106B); an anchoring platform 107 removably and selectively attachable to the elongate base members 102 substantially along the length axes of the secondary horizontal base members 106; a plurality of elongate support members 108 including a first support member 108A removably attachable to the first vertical extension 104A at or near a first end 110A of the first base member 102A, and a second support member 10813 removably attachable to the second vertical extension 104B at or near a first end 112A of the second base member 102B; and a rail apparatus 114 removably attached to the first support member 108A at or near a first end 116A of the first support member 108A, and to the second support member 108B at or near a first end 118A of the second support member 108B.

Figure 2:
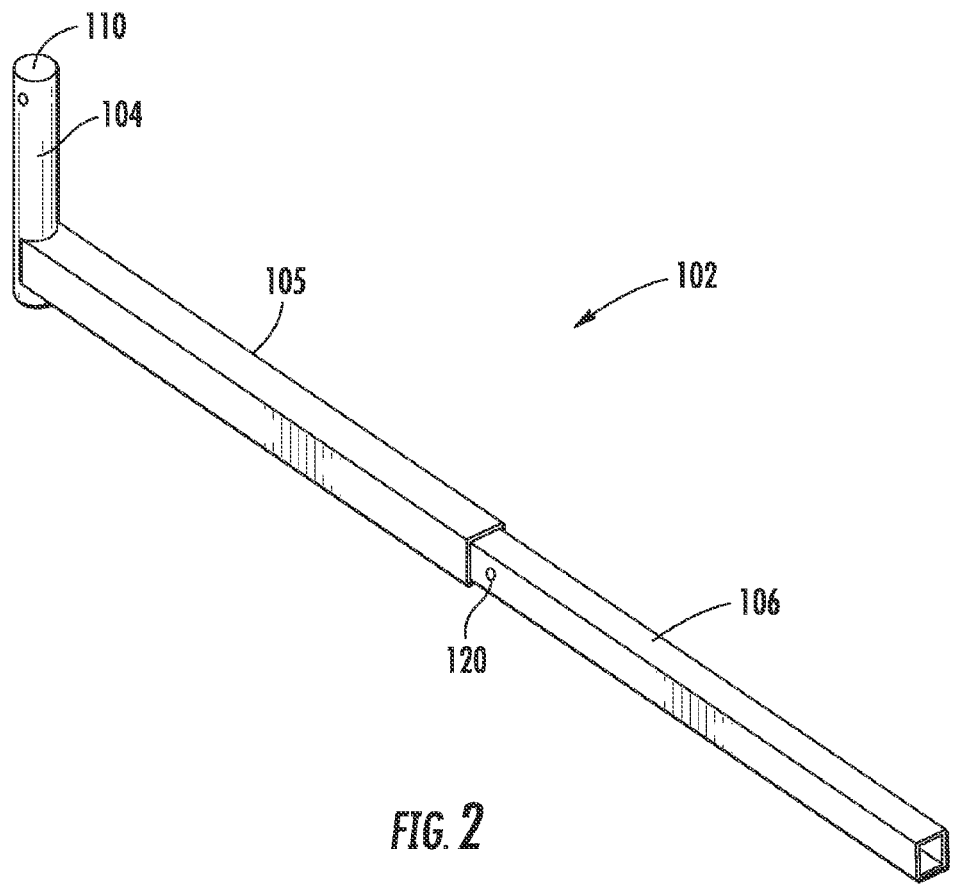
FIG. 2 shows a perspective view of a base member that forms part of the embodiment shown in FIG. 1.
Figure 3:
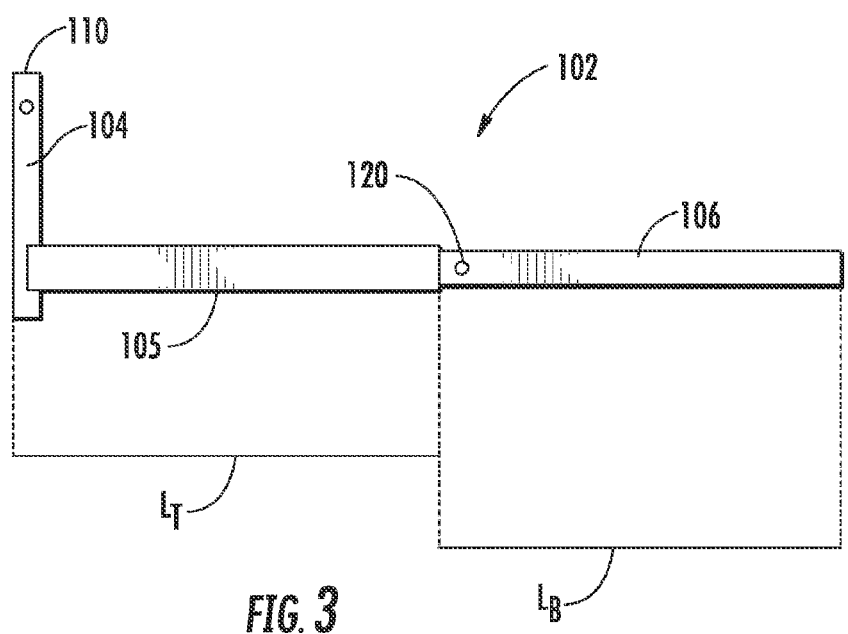
FIG. 3 shows a side view of the base member shown in FIG. 2.

As shown in FIGS. 2 and 3, the horizontal base members 105 and 106 are preferably in the form of wholly or partially hollow beams having a substantially polygonal cross sectional shape (e.g., square). The cross section of the primary horizontal base members 105 are preferably slightly larger than a preferably similarly shaped cross section of the secondary horizontal base members 106. Although polygonal cross-sectional shapes are shown and described here and elsewhere with respect to the horizontal base members and other elements, non-polygonal cross sectional shapes (e.g., circles, ovals, or other non-polygonal shapes) are also contemplated by this disclosure and are preferably used for the cross sections of the vertical extensions 104. Similarly, where curved cross sectional shapes are said to be preferred, non-curved cross sectional shapes (e.g., polygons) are also contemplated by this disclosure in various embodiments.

The secondary horizontal base members 106 preferably have a length (L) ranging from about 100 cm to about 150 cm, more preferably from about 115 cm to about 130 cm, and most preferably about 122 cm. For example, the secondary horizontal base members 106, if in a circular cross sectional configuration, preferably have an average cross-sectional outside diameter ranging from about 2.54 cm to about 7.62 cm, more preferably from about 4.45 cm to about 5.72 cm, and most preferably about 5.08 cm. If, for example, the secondary horizontal base members 106 have a square cross sectional configuration as shown in FIGS. 1-3, the length of one side preferably ranges from about 2.54 cm to about 7.62 cm, more preferably from about 4.5 cm to about 5.75 cm, and most preferably about 5 cm. The secondary horizontal base members 106 also preferably include first apertures 120 as shown in FIG. 2 for removable attachment to additional structures.

The primary horizontal base members 105 preferably have a length (Lr) ranging from about 75 cm to about 115 cm, more preferably from about 85 cm to about 100 cm, and most preferably about 92 cm. The primary horizontal base members 105, if in a circular cross sectional configuration, preferably have an average cross-sectional outside diameter (or side length in the case of, for example, a square cross sectional configuration) ranging from about 5 cm to about 10 cm, more preferably from about 5.75 cm to about 7 cm, and most preferably about 6.35 cm. The support members 108 preferably have a length ranging from about 80 cm to about 140 cm, more preferably from about 95 cm to about 125 cm, and most preferably about 109 cm. The support members 108, if having a circular cross sectional configuration for example, preferably have an average cross-sectional outside diameter ranging from about 2.5 cm to about 7.6 cm, more preferably from about 4.5 cm to about 5.75 cm, and most preferably about 5 cm. If, for example, the support members 108 have a square cross sectional configuration, the length of one side preferably ranges from about 2.54 cm to about 7.6 cm, more preferably from about 4.5 cm to about 5.75 cm, and most preferably about 5 cm.

With reference to FIGS. 1-4, the anchoring platform 107 preferably further includes a mass receiving platform 122 and a plurality of guide members 124 including a first guide member 124A and a second guide member 124B. The guide members 124 are preferably shaped so as to be capable of sliding or otherwise being movable along the respective secondary horizontal base members 106. The guide members 124 also preferably include second apertures 126 for removably attaching the secondary horizontal base members 106 in a substantially fixed position relative to the anchoring platform 107 using a pin or other means of non-permanent attachment through the first apertures 120 and the second apertures 126. The mass receiving platform 122 preferably is in the form of a channel for receiving a vehicle tire or tires. The mass receiving platform 122 preferably has a length ranging from about 1.25 meters (m) to about 1.85 m, more preferably from about 1.45 m to about 1.65 m, and most preferably about 1.55 m. The mass receiving platform 122 preferably has a width ranging from about 25 cm to about 35 cm, more preferably from about 28 cm to about 32 cm, and most preferably about 30 cm. The mass receiving platform 122 preferably has a material thickness ranging from about 7.2 millimeters (mm) to about 8.0 mm, more preferably from about 7.5 mm to about 7.7 mm, and most preferably about 7.6 mm. In a preferred embodiment, the mass receiving platform 122 further includes side walls 123 to form a channel-like shape, the side walls having an average height preferably ranging from about 3 cm to about 12 cm, more preferably from about 5 cm to about 10 cm, and most preferably about 7.5 cm.

The guide members 124 preferably have a length ranging from about 40 cm to about 50 cm, more preferably from about 44 cm to about 48 cm, and most preferably about 45.7 cm. The guide members 124, if having a circular cross sectional configuration, preferably have an average cross-sectional outside diameter (or side length in the case of, for example, a square cross sectional configuration) ranging from about 5 cm to about 10 cm, more preferably from about 5.75 cm to about 7 cm, and most preferably about 6.35 cm.

Figure 5:
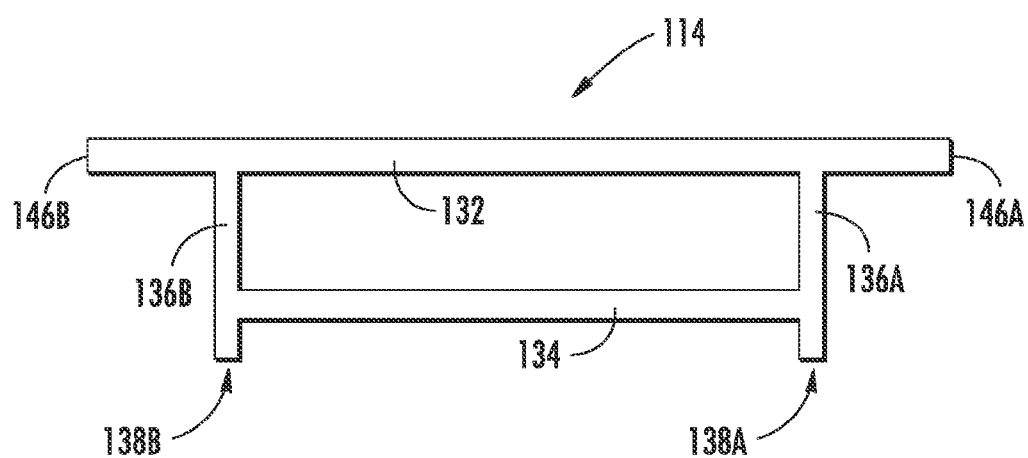
FIG. 5 shows a side view of a rail apparatus that forms part of the embodiment shown in FIG. 1.
Figure 6:
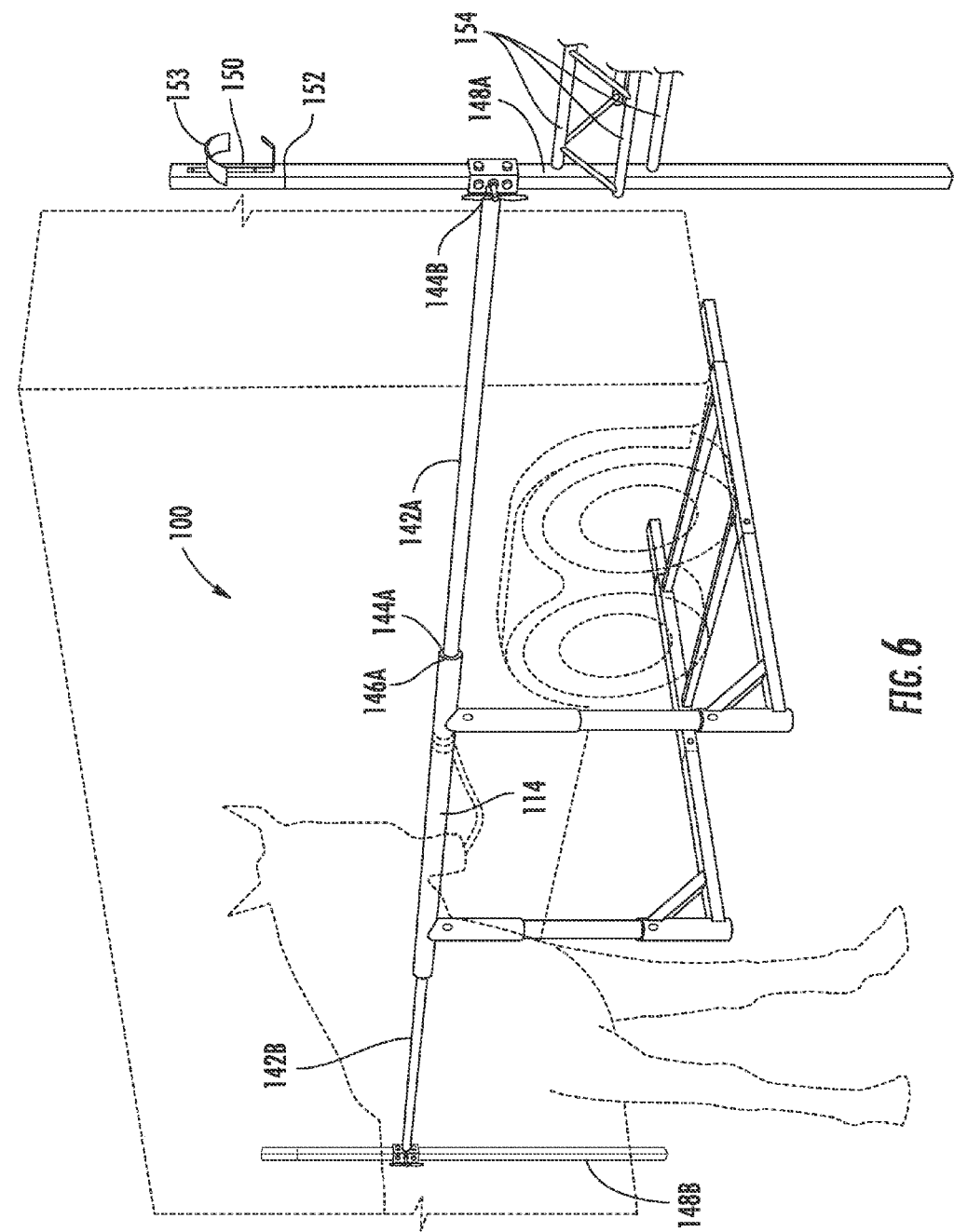
FIG. 6 shows art illustrative view of an embodiment of a portable anchoring apparatus including a hitching rail.

The vertical extensions 104 of the base members 102 are preferably oriented for removable attachment to second ends 116B and 118B of the support members 108, respectively. Persons having ordinary skill in the art, however, appreciate that any attachment apparatus capable of sufficiently attaching a transition member to a support member will suffice. The rail apparatus 114 preferably further includes a primary rail 132, a secondary rail 134, and a plurality of cross rails 136, at least two of such cross rails 136 being oriented substantially orthogonal to the primary rail 132 and secondary rail 134. As shown in FIGS. 1 and 6, the support members 108 are preferably in the form of wholly or partially hollow beams having a substantially curved cross sectional shape (e.g., circular) that is slightly smaller (or, alternatively, larger) than similarly shaped cross sections of the vertical extensions 104 and the cross bars 136 so that the support members 108 may be slid within (or, alternatively, along) and attached to the vertical extensions 104 and the cross bars 136. More specifically, in the embodiment shown in FIGS. 1, 5, and 9, a portion of the cross rails 136 are also used to removably attach the first ends 116A and 118A of the support members 108 to the rail apparatus 114. The cross rails 136 preferably include hollow receiving ends 138A and 138B to enable the first ends 116A and 118A of the support members 108 to fit and attach in the receiving ends 138A and 138B by use of an attachment apparatus (e.g., apertures and pins as described above). The vertical extensions 104 of the base members 102 preferably offer similar hollow receiving ends 110A and 112A to enable the second ends 116B and 118B of the support members 108 to fit and attach therein by use of art attachment apparatus.

In an alternative embodiment, the ends 138 of the cross rails 136 may fit and be attachable within the first ends 116A and 118A of the support members 108. Similarly, the ends 110A and 112A of the vertical extensions 104 may fit and be attachable within the second ends 116B and 118B of the support member 108. Various other attachment apparatuses and configurations are contemplated in this disclosure.

With reference back to the embodiment shown in FIGS. 1-3 and 5, primary rail 132, if having a circular cross sectional configuration, preferably has an average cross-sectional outside diameter (or side length in the case of, for example, a square cross sectional configuration) ranging from about 5 cm to about 10 cm, more preferably from about 5.75 cm to about 7 cm, and most preferably about 6.35 cm. The primary rail 132 preferably has a length ranging from about 1.90 m to about 2.90 m, more preferably from about 2.20 m to about 2.60 m, and most preferably about 2.40 m. The vertical extensions 104, if having a circular cross sectional configuration, preferably have an average cross-sectional outside diameter (or side length in the case of, for example, a square cross sectional configuration) ranging from about 5 cm to about 10 cm, more preferably from about 5.75 cm to about 7 cm, and most preferably about 6.35 cm. The vertical extensions 104 preferably each have a length ranging from about 25 cm to about 37 cm, more preferably from about 28 cm to about 34 cm, and most preferably about 31 cm. The receiving ends 138, if having a circular cross sectional configuration, preferably have an average cross-sectional outside diameter (or side length in the case of, for example, a square cross sectional configuration) ranging from about 5 cm to about 10 cm, more preferably from about 5.75 cm to about 7 cm, and most preferably about 6.35 cm.

Figure 7:
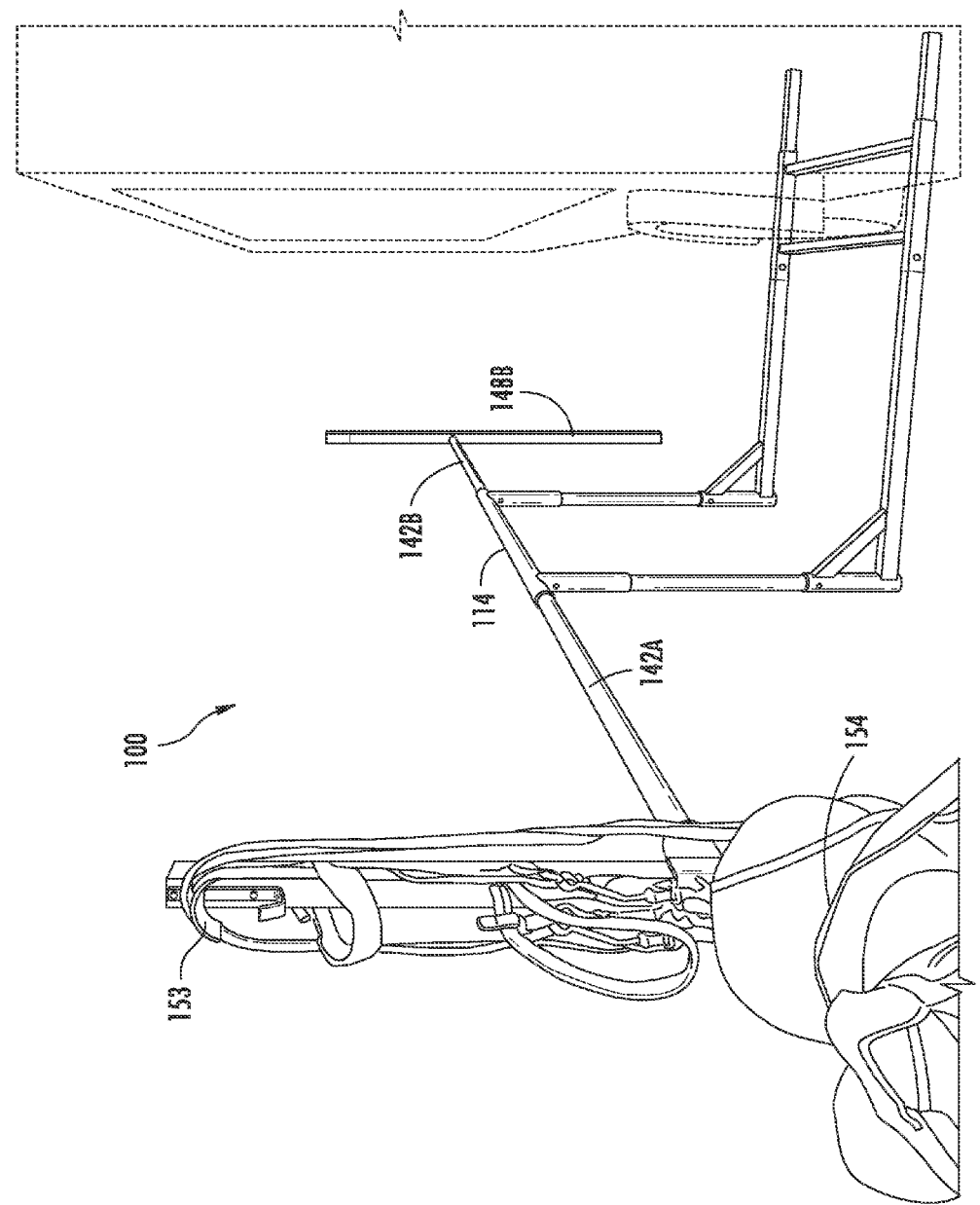
FIG. 7 shows a narrower angle view of the portable anchoring apparatus shown in FIG. 6.
Figure 8:
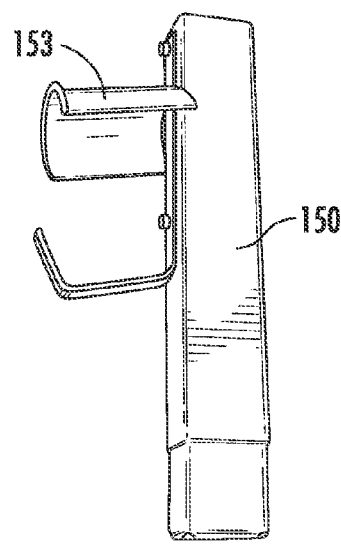
FIG. 8 shows a slightly angled view of a portion of the portable anchoring apparatus shown in FIGS. 6 and 7.
Figure 10:
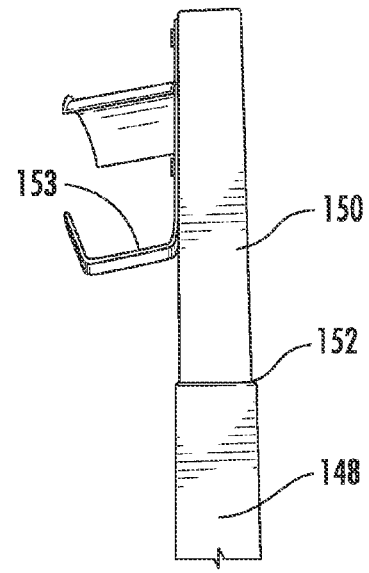
FIG. 10 shows a side view of the apparatus shown in FIG. 8.
Figure 9:
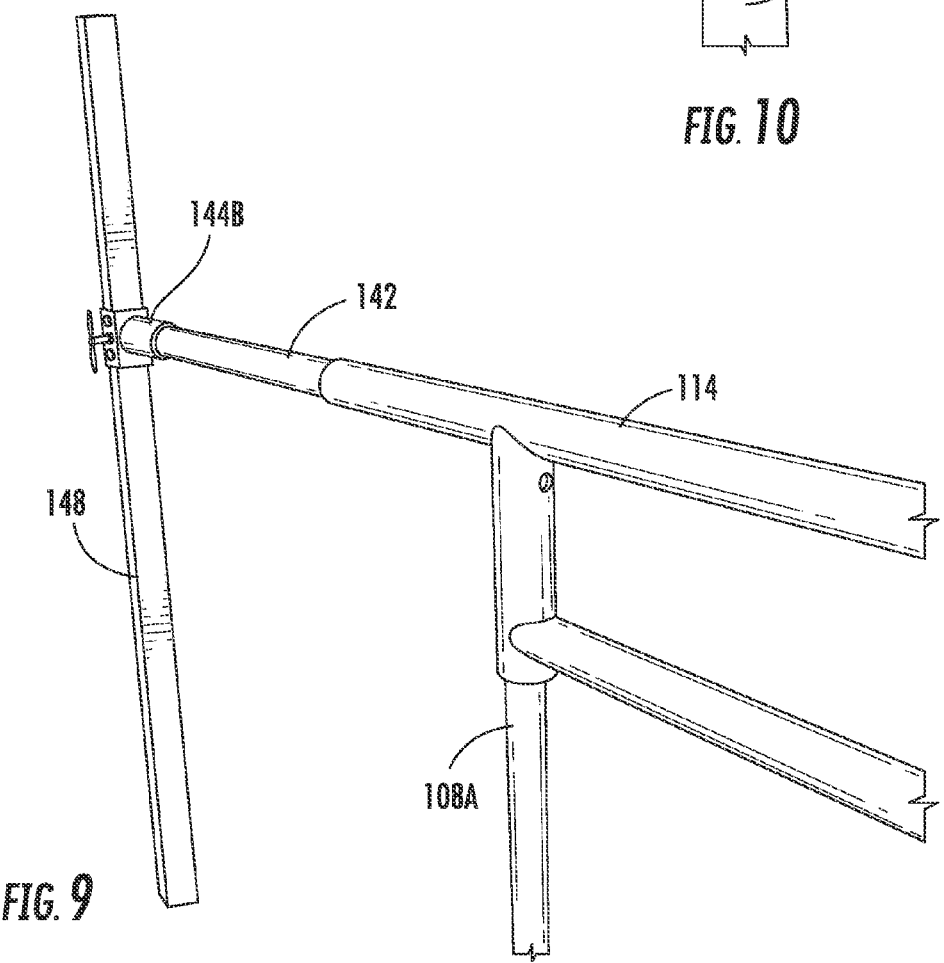
FIG. 9 shows a perspective view of the apparatus shown in FIGS. 6 and 7.

FIGS. 6-7 show a preferred embodiment of the portable anchoring apparatus 100 including a first extension member 142A and a second extension member 142B. The view in FIG. 7 is oriented toward the space between the anchoring mass (e.g., a horse trailer, a truck, a car) and the support members 108 and the rail apparatus 114. The first extension member 142A, for example, further includes a first end 144A and a second end 144B wherein the first end 144A is removably attached to a first end 146A of the rail apparatus 114 (e.g., the primary rail 132). The first extension member 142A is further supported by a first side support 148A that is adjacent the ground, oriented substantially orthogonal to the first extension member 142A, and removably attached to the first extension member 142A at or near the second end 144B of the first extension member 142A. The first side support 148A, for example, preferably extends beyond the second end 144B of the extension member 142 as shown in FIGS. 6, 7, and 9. As shown in FIGS. 6-10, a side support extension member 150 may be removably attached to a first end 152 of the first side support 148A, the side support extension member 150 including features allowing a user to hang materials on the side of the anchoring apparatus 100. Such features may include, for example, a bridle holder 153 and/or a solar powered light for use at night. The first side support 148A itself may include an attachment structure for attaching a specifically designed item such as, for example, a saddle rest 154. The distal side of the portable anchoring apparatus 100 preferably includes a second extension member 142B, a second side support 148B, and a second side support extension member 150B as shown in FIGS. 6-7.

As shown in FIGS. 6-7, the extension member 142 is preferably in the form of a wholly or partially hollow beam having a substantially curved cross sectional shape (e.g., circular). The extension member 142 preferably has a length ranging from about 2.1 m to about 2.6 m, more preferably from about 2.3 m to about 2.4 m, and most preferably about 2.35 m. The extension member 142 is preferably attached to the rail apparatus 114 and the side support 148 by locking pin attachment apparatuses as shown, for example, in FIGS. 18-19. The extension member 142, if having a circular cross sectional configuration, preferably has an average cross-sectional outside diameter (or side length in the case of for example, a square cross sectional configuration) ranging from about 2.54 cm to about 7.62 cm, more preferably from about 4.45 cm to about 5.72 cm, and most preferably about 5.08 cm. The side support 148 is preferably in the form of a wholly or partially hollow beam having a substantially polygonal cross sectional shape (e.g., square) and preferably has a length ranging from about 1.45 m to about 1.90 m, more preferably from about 1.60 m to about 1.70 m, and most preferably about 1.65 m. The side support 148, if having a circular cross sectional configuration, preferably has an average cross-sectional outside diameter (or side length in the case of, for example, a square cross sectional configuration) ranging from about 2.54 cm to about 7.62 cm, more preferably from about 4.45 cm to about 5.72 cm, and most preferably about 5.08 cm. As shown in FIGS. 6, 7, and 9, the side support extension member 150 is preferably in the form of a wholly or partially hollow beam having a substantially polygonal cross sectional shape (e.g., square) and preferably has a length ranging from about 20.5 cm to about 40.5 cm, more preferably from about 25.5 cm to about 35.5 cm, and most preferably about 30.5 cm. The side support extension member 150, if having a circular cross sectional configuration, preferably has an average cross-sectional outside diameter (or side length in the case of, for example, a square cross sectional configuration) ranging from about 2.0 cm to about 6.9 cm, more preferably from about 4.0 cm to about 4.9 cm, and most preferably about 4.45 cm.

In an alternative embodiment, the rail apparatus 114 is permanently attached to the support members 108 as, for example, by welding or manufacturing as a single piece. In a related embodiment, there is no secondary rail 134. In yet another embodiment, the base members 102 may each further include a support member 108 permanently attached thereto as, for example, by welding or manufacturing as a single piece. In another embodiment, the base members 102 are permanently attached to the anchoring platform 107 as, for example, by welding or manufacturing as a single piece. In one particular embodiment, all of the pieces of the apparatus shown in FIG. 1 may be permanently attached together as, for example, by welding or other permanent means of attachment.

Figure 11:
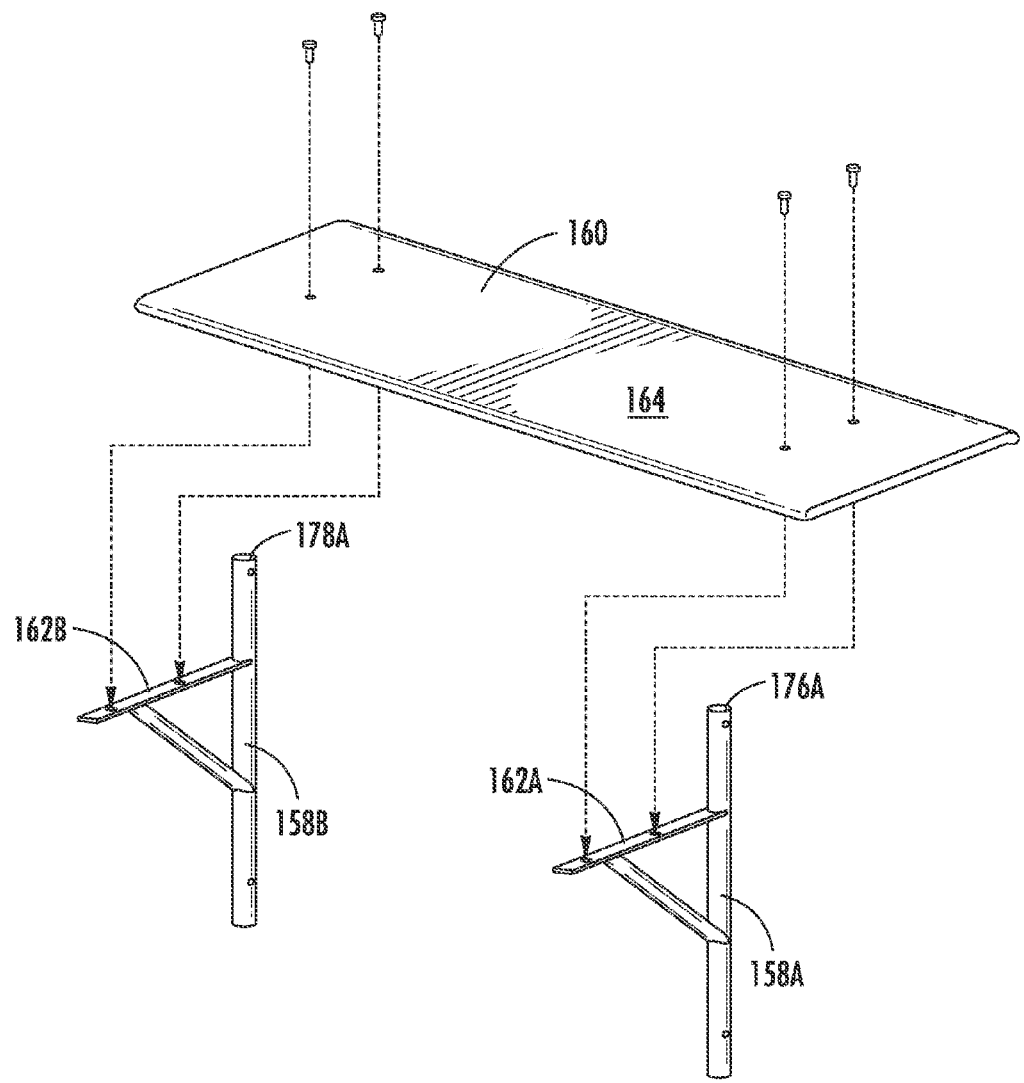
FIG. 11 shows a somewhat schematic and perspective view or a portable anchoring apparatus including a support structure.
Figure 12:
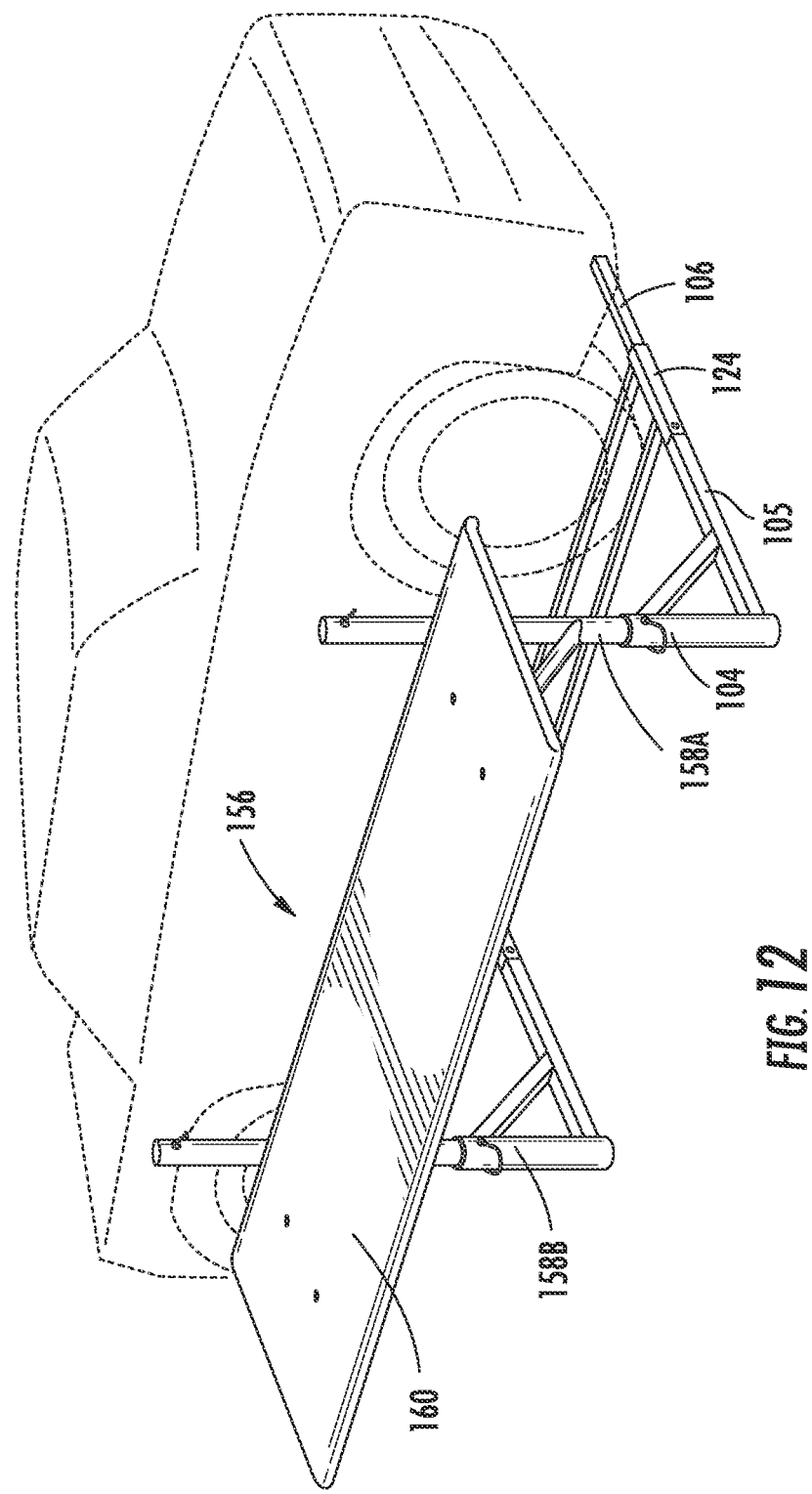
FIG. 12 shows an illustrative view of the embodiment shown in FIG. 11.

Another preferred embodiment of the disclosure is shown in FIGS. 11 and 12, showing a portable anchoring apparatus 156 including the base members 102, the anchoring platform 107, and the transition members 106. The portable anchoring apparatus 156 further includes at least two modified support members 158A and 15813 and a support platform 160. The support platform 160 is preferably removably attached to attachment surfaces 162A and 162B along the modified support members 158 by, for example, bolts, screws, or other non-permanent attachment devices. Alternatively, the support platform 160 may be permanently attached to the modified support members 158 as, for example, by welding or other permanent means of attachment. FIG. 12 shows an exemplary embodiment of the portable anchoring apparatus 156 wherein the support platform 160 is substantially parallel with the horizontal base members 105 and 106, thereby providing, for example, a large table surface. Other embodiments are contemplated wherein the attachment surfaces 162 of the modified support members 158 are angled away from or, alternatively, toward the anchoring platform 107 so that the support platform 160, when attached to the attachment surfaces 162, is angled in the same manner as the attachment surfaces 162. The upper surface 164 of the support platform 160 preferably has an area ranging from about 1.5 m² to about 3.0 m² more preferably from about 1.7 m² to about 2.8 m², and most preferably about 2.23 m².

Figure 13:
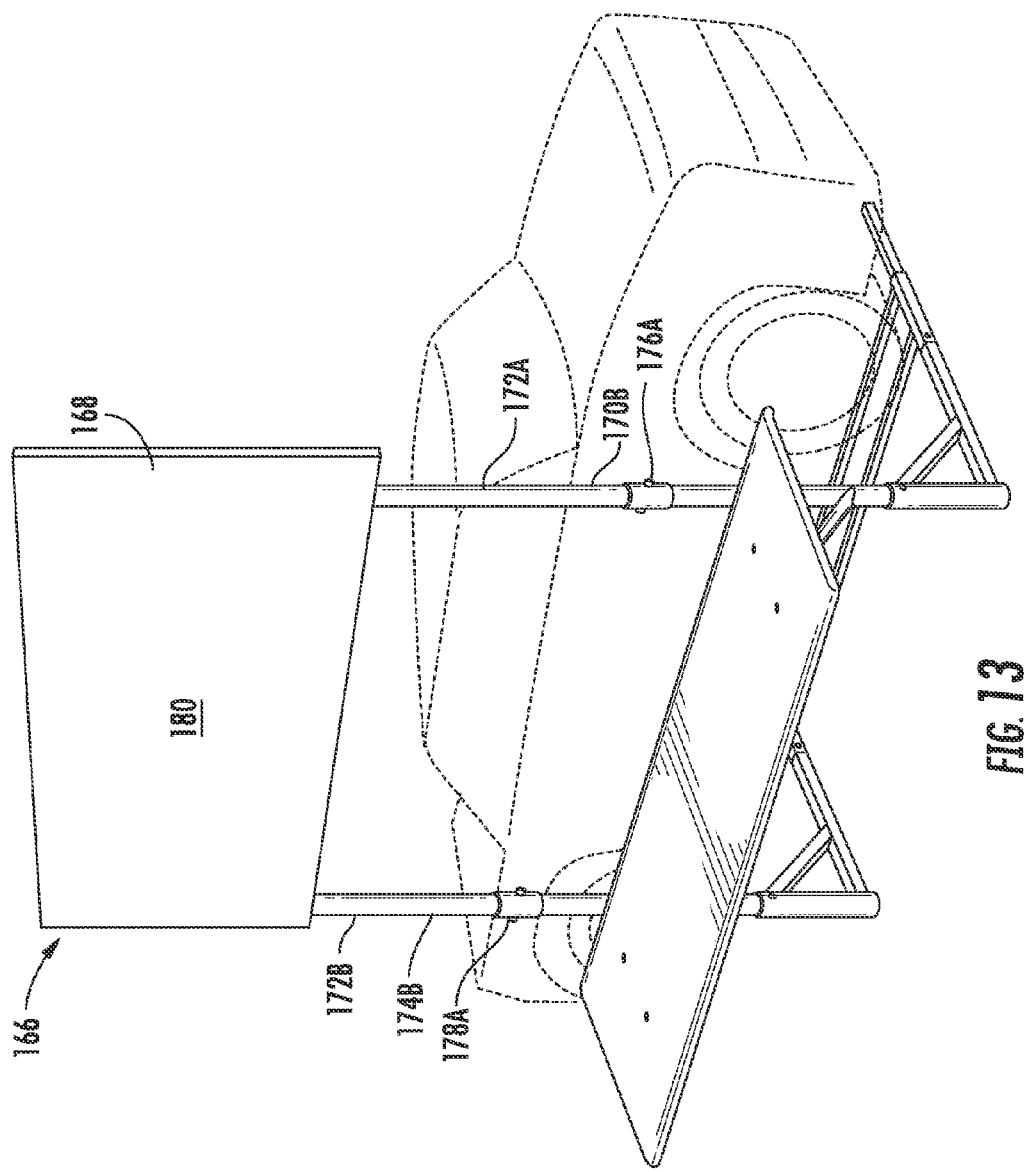
FIG. 13 shows a modified embodiment of the portable anchoring apparatus shown in FIGS. 11 and 12 wherein the illustrated embodiment further includes a sign.
Figure 14:
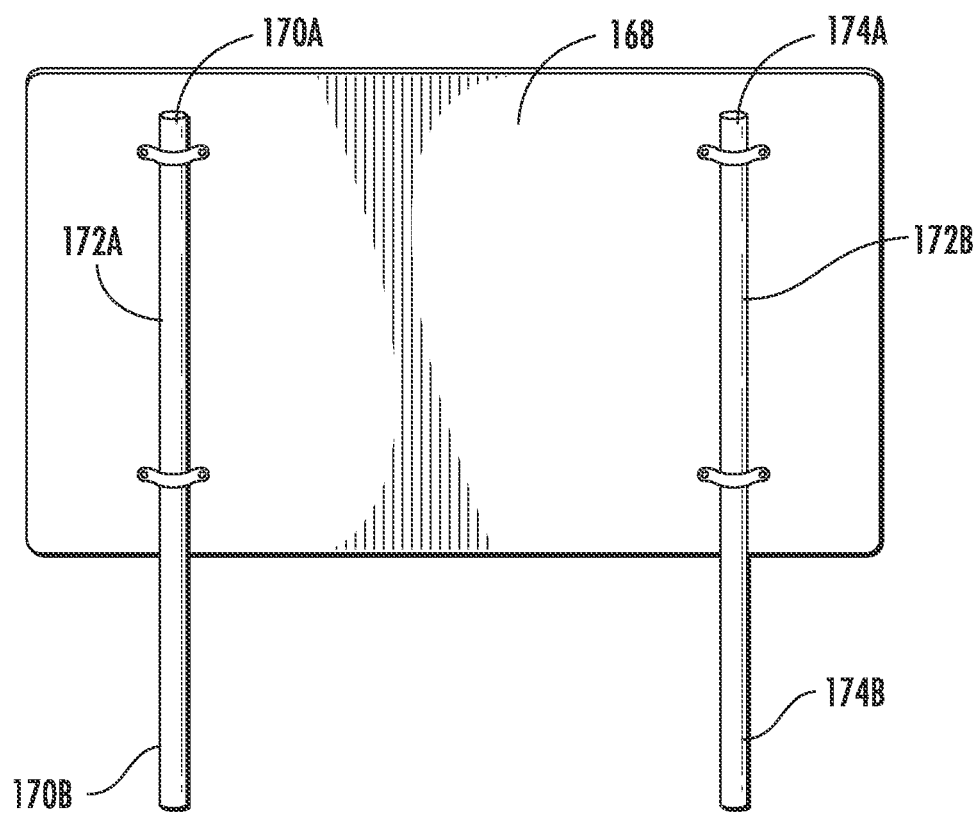
FIG. 14 shows a rear view of the sign and sign support posts from the embodiment shown in FIG. 13.

In a related embodiment shown in FIGS. 13-14, the portable anchoring apparatus 156 further includes a sign apparatus 166, the sign apparatus 166 including a display structure 168 attached (removably or permanently) to or near a first end 170A of a first post member 172A and a first end 174A of a second post member 172B. FIG. 14 shows how the post members 172 may be attached to the display structure 168 using, for example, U-bolts. A second end 170B of the first post member is configured for removable attachment to a first end 176A of the first modified support member 158A. Similarly, a second end 174B of the second post member 172B is configured for removable attachment to a first end 178A of the second modified support member 15813. In this way, the portable anchoring apparatus provides, for example, both a large table surface as well as a large sign surface 180. The sign surface 180 preferably ranges from about 2.4 m² to about 3.6 m², more preferably from about 2.7 m² to about 3.3 m², and most preferably about 3.0 m². The post members 172 are preferably in the form of wholly or partially hollow beams having a substantially polygonal cross sectional shape (e.g., square).

Figure 15:
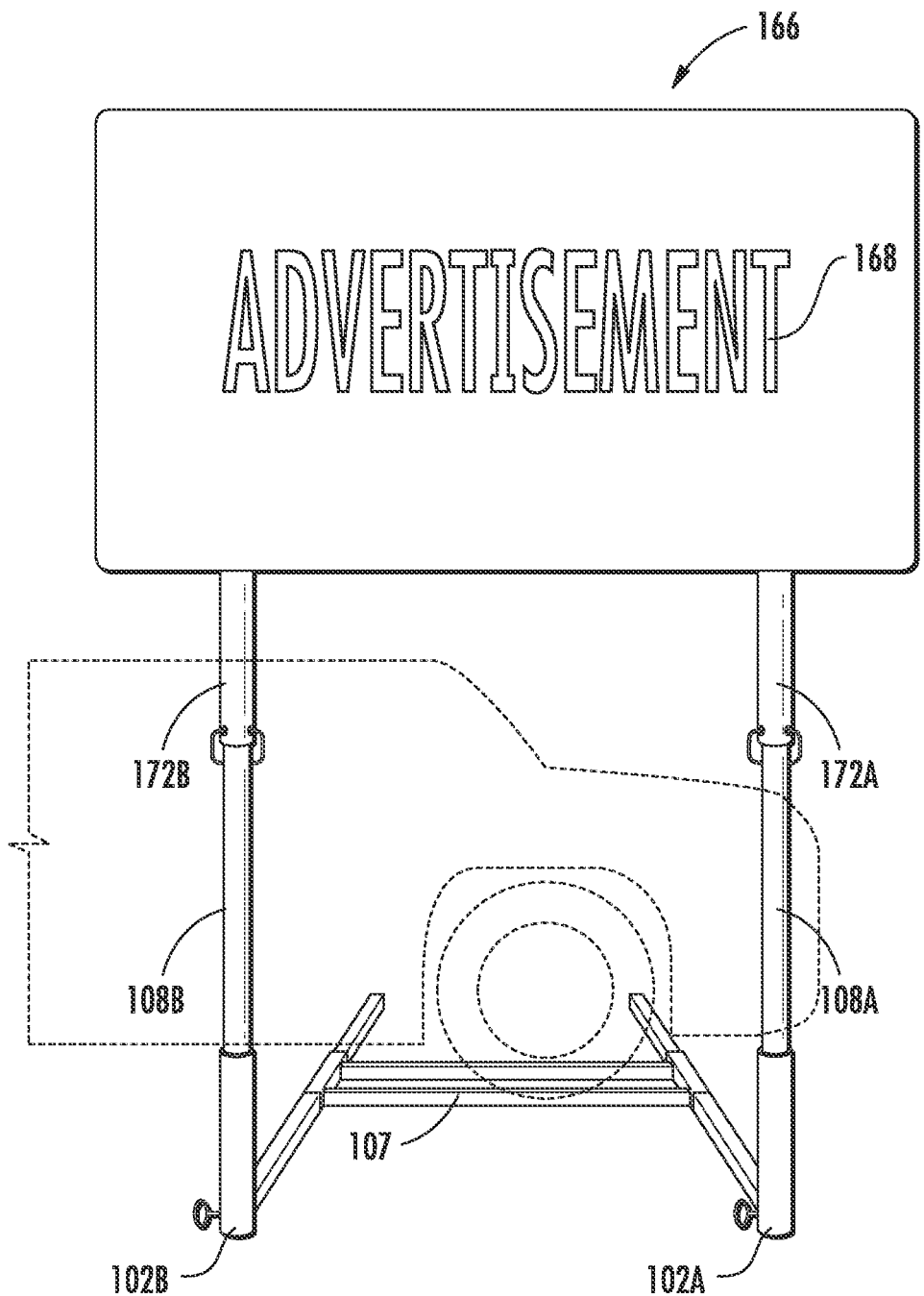
FIG. 15 shows another embodiment of a portable anchoring apparatus similar to the embodiment shown in FIG. 13 but without the support structure.
Figure 16:
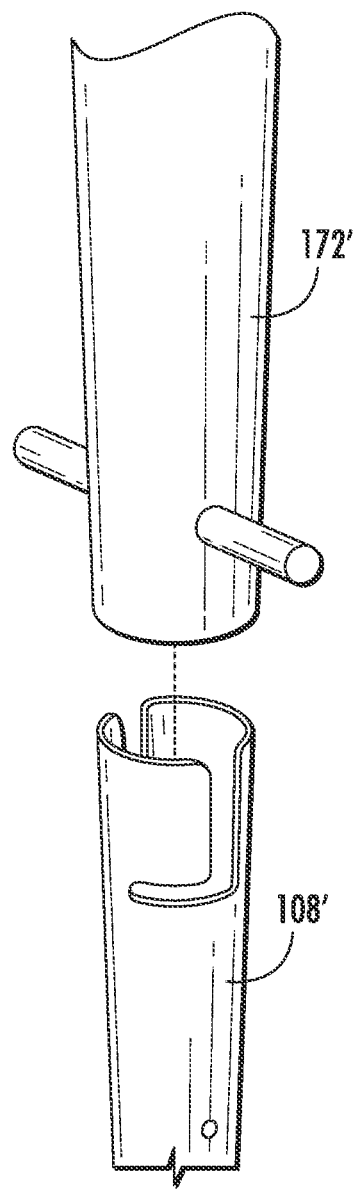
FIG. 16 shows an exemplary embodiment of an attachment means that may be used to attach beams together in certain embodiments of the invention.

In an alternative embodiment shown in FIG. 15, instead of using the modified support members 158, the support members 108 in the prior embodiments may be used so as to provide a large area to provide signage without a support platform 160. The length of the post members 172 preferably ranges from about 1.0 m to about 2.5 m, more preferably from about 1.78 in to about 1.88 m, and most preferably about 1.83 m. The post members 172, if having a circular cross sectional configuration, preferably have an average cross-sectional outside diameter (or side length in the case of, for example, a square cross sectional configuration) ranging from about 2.0 cm to about 6.9 cm, more preferably from about 4.0 cm to about 4.9 cm, and most preferably about 4.45 cm.

Figure 4:
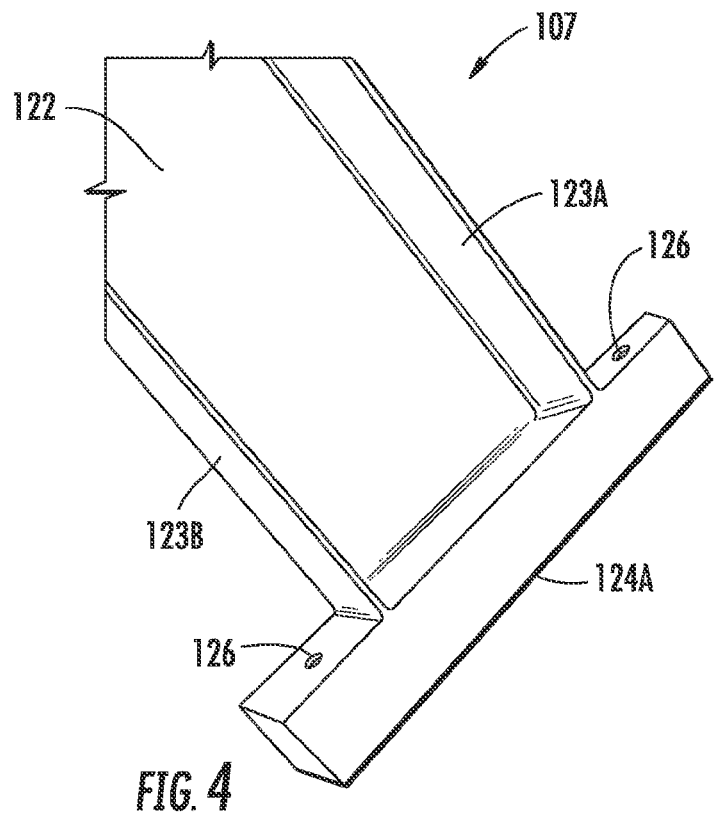
FIG. 4 shows a perspective view of a portion of an anchoring member which forms part of the embodiment shown in FIG. 1.
Figure 17:
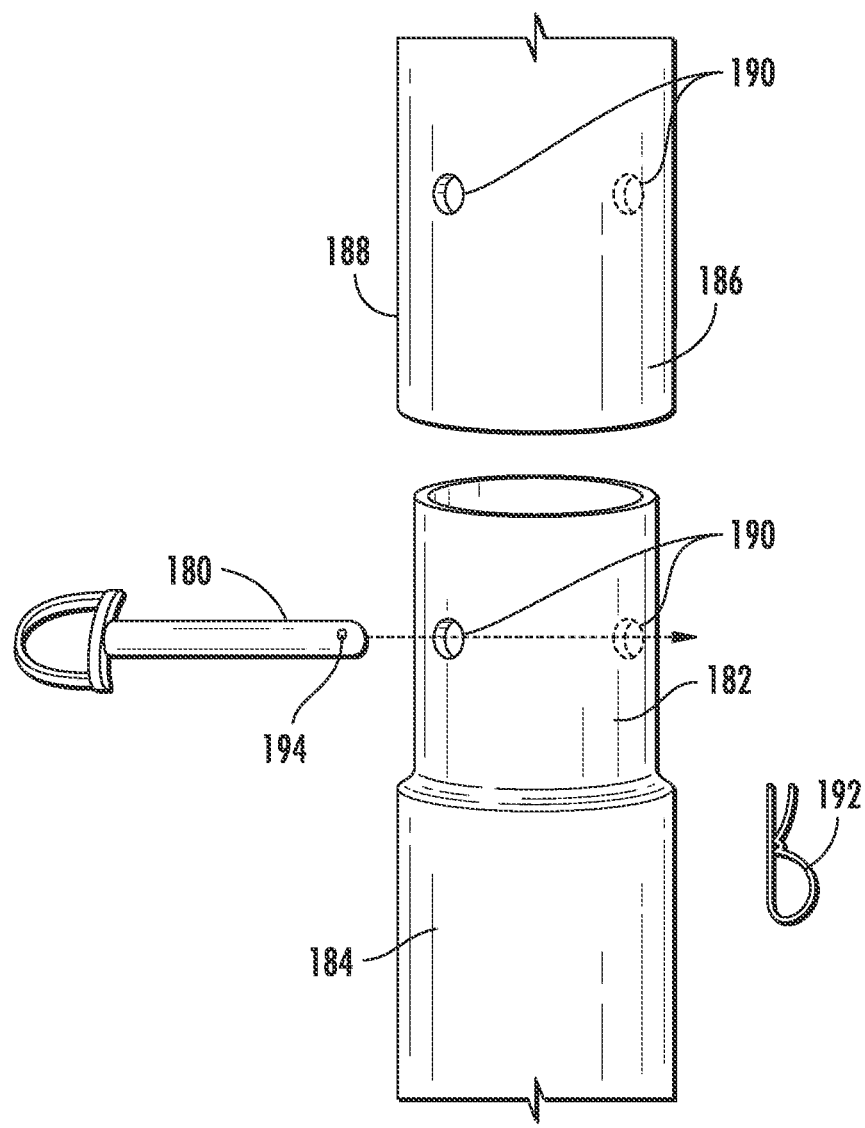
FIG. 17 shows another exemplary embodiment of an attachment means that may be used to attach beams together in certain embodiments of the invention.
Figure 18:
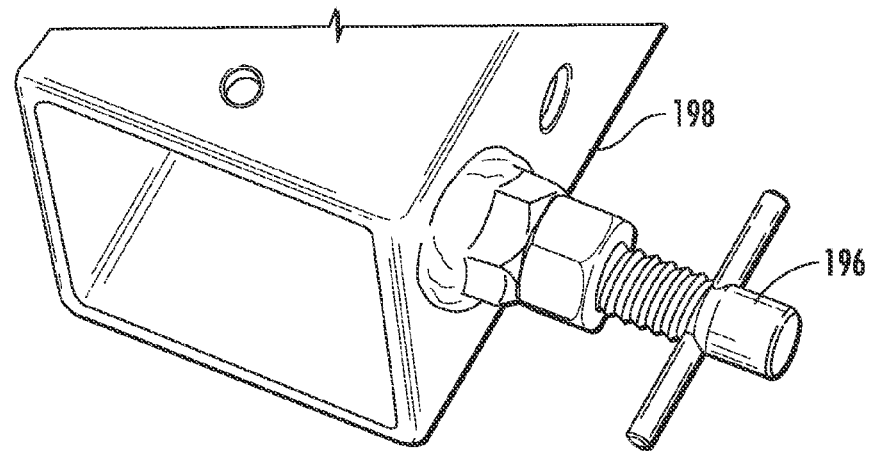
FIG. 18 shows another exemplary embodiment of an attachment means that may be used to attach beams and other structures together in certain embodiments of the invention.
Figure 19:
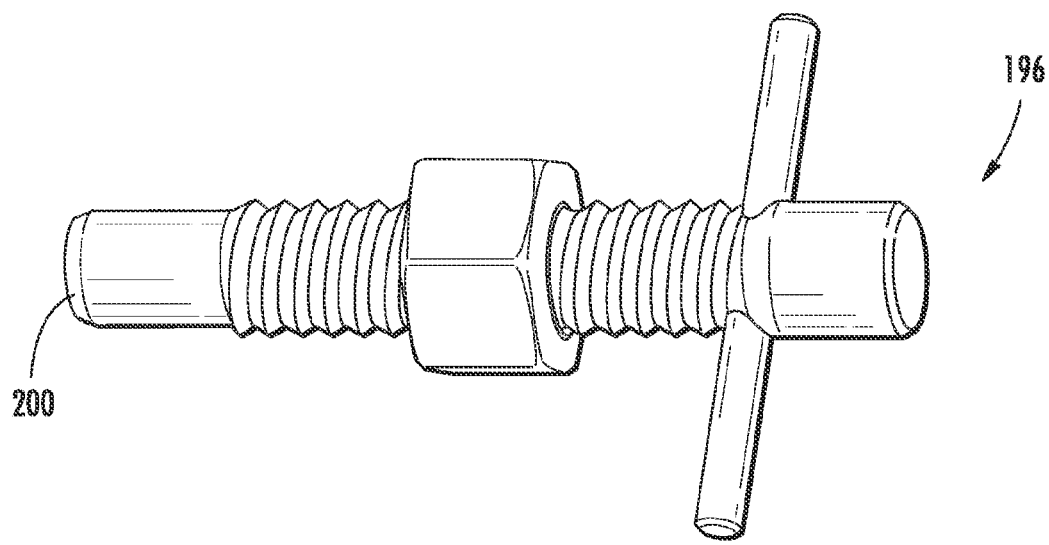
FIG. 19 shows a close up view of a device used to attach structures together to form certain embodiments of the invention.

The various embodiments of the portable anchoring apparatuses described above are preferably made from a sturdy material such as, for example, aluminum, steel, titanium, and mixtures thereof. The most preferred material is aluminum or an aluminum alloy. The portable anchoring apparatuses may also be made from a sturdy composite material, a sturdy solidified polymer, wood, or other sturdy non-brittle material. The thickness of the various elements described above (excluding attachment apparatuses and other basic materials of construction known to a person having ordinary skill in the art) preferably ranges from about 2.5 mm to about 4.0 mm, more preferably from about 3.0 mm to about 3.4 mm, and most preferably about 3.2 mm. Various parts of the embodiments described above may be removably attached together using various attachment apparatuses known to persons having ordinary skill in the art. Other examples include a modified support member 108' removably attached to a modified post member 172' by a twist-lock male/female configuration. FIG. 17 shows a removable attachment apparatus—a pin 180—wherein one narrower portion 182 of a first object 184 slides into a wider portion 186 of a receiving object 188, and the two objects are pinned together by inserting the pin 180 through a plurality of apertures 190. In a preferred embodiment, the pin 180 may be further stabilized by inserting, for example, a locking clip 192 through a pin aperture 194. FIGS. 18 and 19 show yet another attachment apparatus including a locking pin 196 wherein such locking pin 196 may be inserted, preferably along grooves such as found on a screw, through an aperture 198 along a first object, wherein the aperture 198 is also preferably grooved to engage the locking pin 196. A first end 200 of the locking pin 196 is further engageable with a second object locatable within the first object (e.g., a secondary horizontal base member 106 and a guide member 124 as shown in FIG. 4).

There are a variety of uses for the embodiments described herein, one of which is use as a portable horse hitching apparatus as shown in FIGS. 1-10. The embodiments shown in FIGS. 1-10 may also be used to tie up one or more animals other than horses. Alternatively, the embodiment shown in FIGS. 11-14 may be used as a portable table or other similar support structure that may be used, for example, as a display and/or selling booth, kiosk, and/or stand at a market or other event requiring a booth-like structure. The use as a booth-like structure may be enhanced by the addition of the sign apparatus 166 for attracting potential customers, visitors, or other on-lookers. FIG. 15 shows yet another use as a large sign (without a booth-like structure) which may be assembled quickly to attract, warn, or otherwise provide information or expression of a concept to an on-looker.

The previously described embodiments of the present disclosure have many advantages. For example, the portable anchoring apparatus 100 and variations thereof shown in FIGS. 1-10 is structured so as to keep hitched animals a certain minimal distance away from the anchoring object (e.g., a trailer or other expensive vehicle).

Additionally, the use of one or more extension members 142 prevents an animal (e.g., a horse) from getting close enough to the anchoring object to paw, chew, kick, gore, and/or rub such anchoring object. In so doing, both the anchoring object is protected from damage caused by the hitched animal and the animal is protected from sharp objects or other hazards that may be present on the anchoring object.

Unlike many prior disclosed devices, the various parts of the embodiments shown in FIGS. 1-10 are not directly or otherwise permanently attached to an anchoring object. Rather, the anchoring object provides substantial mass only on the mass receiving platform 122 to prevent the portable anchoring apparatus from moving, but will not cause direct damage to the anchoring object if, for example, a horse pulls suddenly and/or violently away from the portable anchoring apparatus, causing the apparatus to break or otherwise fail.

The embodiments shown in FIGS. 11-15 are advantageous because a sturdy and robust support platform may be transported to/from remote locations and used effectively in many different ways, such as, for example, a table. The spacing between an anchoring object and the support platform is ideal for a person to stand or sit as in a booth, kiosk, stand or other similar booth-like structure. Large signage may also be employed and supported on the booth-like structure (i.e., the sign apparatus 166), attracting attention to the location where the particular apparatus is assembled and deployed. The signage may be used with or without the use of a support platform. Therefore, the majority of parts of various embodiments are usable in various configurations, resulting in significant flexibility for a user who may have a need to use a remote hitching rail at a first event, a remote booth at a second event, and a large sign with no booth at a third event or location. The portable nature of the various embodiments is particularly useful in hard terrain and/or the winter months in northern zones (or southern zones as the case may be below the equator) where the ground is too hard to anchor a large sign or other structure by digging into the ground.

Another significant advantage of all of the various embodiments described herein is the general portable nature of the embodiments. Each embodiment may be quickly and easily assembled and/or disassembled with few tools, if any, depending on the particular embodiment used. In summary the embodiments described herein provide a convenient, robust, relatively lightweight, rapid assemble/disassemble structure for performing activities in remote locations including hitching strong animals at a desired distance from an anchoring object, providing a booth-like site with or without relatively large signage, and providing relatively large signage for attracting the attention of on-lookers.

The foregoing description of preferred embodiments of the present disclosure has been presented for purposes of illustration and description. The described preferred embodiments are not intended to be exhaustive or to limit the scope of the disclosure to the precise form(s) disclosed. Obvious modifications or variations are possible in light of the above teachings. The embodiments are chosen and described in an effort to provide the best illustrations of the principles of the disclosure and its practical application, and to thereby enable one of ordinary skill in the art to utilize the concepts revealed in the disclosure in various embodiments and with various modifications as are suited to the particular use contemplated. All such modifications and variations are within the scope of the disclosure as determined by the appended claims when interpreted in accordance with the breadth to which they are fairly, legally, and equitably entitled.

Any element in a claim that does not explicitly state "means for" performing a specified function, or "step for" performing a specific function, is not to be interpreted as a "means" or "step" clause as specified in 35 U.S.C. §112, ¶6. In particular, the use of "step of" in the claims herein is not intended to invoke the provisions of 35 U.S.C. §112, ¶6.

What is claimed is:

1. A portable, quick assembly anchoring apparatus for hitching a large animal at a safe distance from an anchoring object, the apparatus comprising an anchoring platform; a plurality of elongate base members including a first base member and a second base member, wherein each base member includes a first end and a second end, wherein the anchoring platform is removably attachable along a portion of the respective lengths of the base members at or near the respective first ends of the base members; a rail apparatus including a first end and a second end, wherein the rail apparatus is removably attachable adjacent the base members at or near the respective second ends of the base members; an elongate first extension member removably attachable at or near the first end of the rail apparatus; and a first side support removably attachable at or near a distal end of the first extension member, the first side support including a bridle holder for hitching a large animal to the anchoring apparatus, wherein the first side support is oriented substantially orthogonal to the extension member, and wherein a distal end of the first side support is configured to rest adjacent the ground when assembled to provide support for the first extension member;
wherein at least part of the first extension member may be linearly reciprocated relative to the rail apparatus and wherein the first extension member may be set in a temporary fixed position relative to the rail apparatus by an attachment apparatus whereby the portion of the length of the first extension member extending from the first end of the rail apparatus may be selectively adjusted
wherein the anchoring platform further comprises a mass receiving platform having a first end and a second end, the mass receiving platform including a substantially planar plate configured for receiving one or more anchoring objects; a first guide member attached at or near the first end of the mass receiving platform, the first guide member oriented substantially perpendicular to the length axis of the mass receiving platform wherein the first guide member is configured for removable attachment adjacent the first end of the first base member; and a second guide member attached at or near the second end of the mass receiving platform, the second guide member oriented substantially perpendicular to the length axis of the mass receiving platform wherein the second guide member is configured for removable attachment adjacent the first end of the second base member.

2. The anchoring apparatus of claim 1 wherein the base members each further comprise a plurality of sub-parts including a primary member, a secondary member, and a tertiary member, wherein the secondary members comprise the first ends of the base members, respectively, and wherein the tertiary members comprise the second ends of the base members, respectively, and wherein the tertiary members are removably attachable to the secondary members.

3. The anchoring apparatus of claim 1 wherein the tertiary member of the first base member further comprises a first transition member oriented substantially orthogonal to the first base member and an elongate first support member removably attachable to a distal end of the first transition member; and wherein the tertiary member of the second base member further comprises a second transition member oriented substantially orthogonal to the second base member and an elongate second support member removably attachable to a distal end of the second transition member.

4. The anchoring apparatus of claim 1 further comprising an elongate second extension member removably attachable at or near the second end of the rail apparatus; and a second side support removably attachable at or near a distal end of the second extension member wherein the second side support is oriented substantially orthogonal to the extension member, and wherein a distal end of the second side support is configured to rest adjacent the ground when assembled to provide support for the second extension member.

5. The anchoring apparatus of claim 1, wherein the rail apparatus further comprises a primary rail, a secondary rail, and a plurality of cross rails, wherein the primary rail and the secondary rail are substantially parallel, wherein at least two of the cross rails are oriented substantially orthogonal to the primary rail, and wherein the primary rail and the secondary rail are both attached to the at least two cross rails.

6. The anchoring apparatus of claim 1 wherein the transition members, base members, support members, rail apparatus, extension members, and side supports each comprise substantially hollow metal beams having an average wall thickness ranging from about 2.5 mm to about 4.0 mm and an average cross-sectional diameter ranging from about 2.0 cm to about 7.0 cm, wherein the metal is selected from the group consisting of aluminum, an aluminum alloy, magnesium, a magnesium alloy, titanium, a titanium alloy, iron, and an iron alloy.

7. The anchoring apparatus of claim 1 wherein part of the first base member may be reciprocated within a hollow interior of the first guide member, wherein part of the second base member may be reciprocated within a hollow interior of the second guide member, and wherein the anchoring platform may be set in a temporary fixed position relative to the base members by an attachment apparatus.

8. A multipurpose portable anchoring apparatus comprising:
 a plurality of elongate base members including a first base member and a second base member, each base member including a first end and a second end;
 an anchoring platform, the anchoring platform including a mass receiving platform having a first end and a second end, the mass receiving platform including a substantially planar plate for receiving one or more anchoring objects; a first guide member attached at or near the first end of the mass receiving platform, the first guide member oriented substantially perpendicular to the length axis of the mass receiving platform for removable attachment to the first base member at or near the first end of the first base member; and a second guide member attached at or near the second end of the mass receiving platform, the second guide member oriented substantially perpendicular to the length axis of the mass receiving platform for removable attachment to the second base member at or near the first end of the second base member; and
 an application apparatus removably attached at or near the second ends of the base members wherein the application apparatus further comprises a rail apparatus including a first end and a second end; wherein the first base member further comprises an elongate first support member including a first end and a second end, and the second base member further comprises an elongate second support member including a first end and a second end; wherein the support members are permanently or removably attached to the rail apparatus at or near the second ends of the support members.

9. A multipurpose portable anchoring apparatus comprising:
 a plurality of elongate base members including a first base member and a second base member, each base member including a first end and a second end;
 an anchoring platform, the anchoring platform including a mass receiving platform having a first end and a second end, the mass receiving platform including a substantially planar plate for receiving one or more anchoring objects; a first guide member attached at or near the first end of the mass receiving platform, the first guide member oriented substantially perpendicular to the length axis of the mass receiving platform for removable attachment to the first base member at or near the first end of the first base member; and a second guide member attached at or near the second end of the mass receiving platform, the second guide member oriented substantially perpendicular to the length axis of the mass receiving platform for removable attachment to the second base member at or near the first end of the second base member; and
 an application apparatus removably attached at or near the second ends of the base members wherein the application apparatus further comprises a support platform including a substantially planar upper surface; wherein the first base member further comprises an elongate first modified support member including a first end, a second end, and a support arm; and the second base member further comprises an elongate second modified support member including a first end, a second end, and a support arm; wherein the support arms of the modified support members are permanently or removably attached to the support platform for supporting the support platform.

10. The multipurpose portable anchoring apparatus of claim 9 further comprising a first post beam including a first end and a second end, a second post beam including a first end and a second end, and a display structure including a sign surface, wherein the first modified support member is removably attached to the first post beam at or near the second end of the first modified support member and at or near the first end of the first post member, the second modified support member is removably attached to the second post beam at or near the second end of the second modified support member and at or near the first end of the second post member, and the display structure is permanently or removably attached to the post members at or near the second ends of the post members.

* * * * *